INVENTOR.
JOHN E. GOLOB
BY
ATTORNEY

Patented May 26, 1953

2,639,726

UNITED STATES PATENT OFFICE 2,639,726

APPARATUS FOR CONTROLLING THE PRESSURE IN LIQUID CONTAINERS

John E. Golob, Dayton, Ohio, assignor to Standard-Thompson Corporation, Dayton, Ohio, a corporation of Delaware Application June 14, 1947, Serial No. 754,680

11 Claims. (Cl. 137—493)

This invention relates to an apparatus for controlling the pressure in a liquid container and is designed primarily for maintaining a desired pressure in the oil tank of an aircraft when flying at high altitude.

It is desirable that the pressure in the oil tank of an aircraft shall be such as to prevent a cavitation. When flying at low altitude atmospheric pressure is sufficient for the purpose but when flying at high altitude the relatively low atmospheric is insufficient and it is desirable to build up in the tank a pressure greater than the pressure of the ambient atmosphere.

One object of the invention is to provide an apparatus which will automatically maintain the desired pressure in the tank at all altitudes.

A further object of the invention is to provide such an apparatus which will maintain the tank in open communication with the atmosphere when the pressure of the ambient atmosphere exceeds a predetermined pressure and will interrupt that communication when the pressure of the ambient atmosphere is less than said predetermined pressure, and which will automatically vent the tank to relieve excessive pressure therein.

A further object of the invention is to provide such an apparatus having a valve controlled by atmospheric pressure to open and close a passage leading from the tank to the atmosphere and having a second valve to automatically limit the pressure in the tank when said passage is closed.

Other objects of the invention may appear as the apparatus is described in detail.

Figure 1:
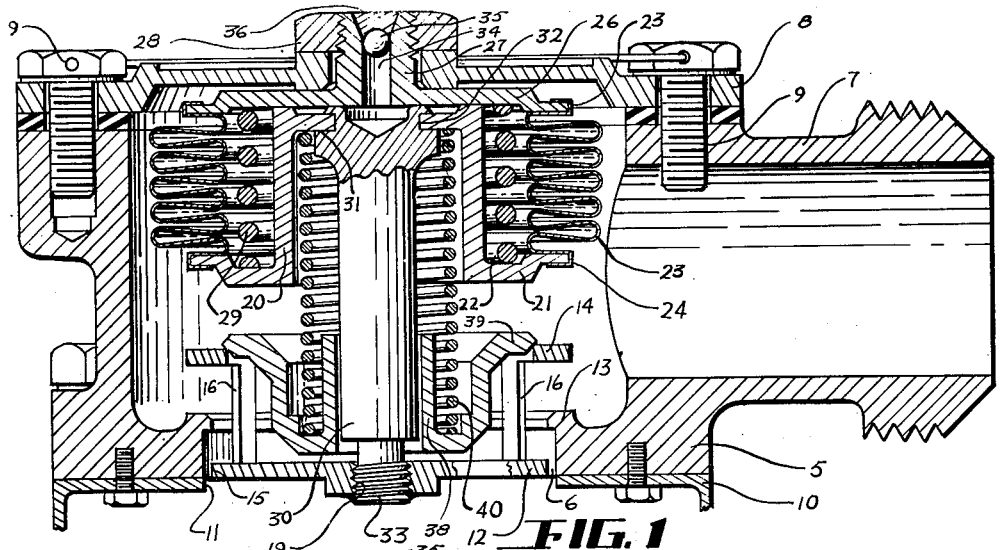
Figure 2:
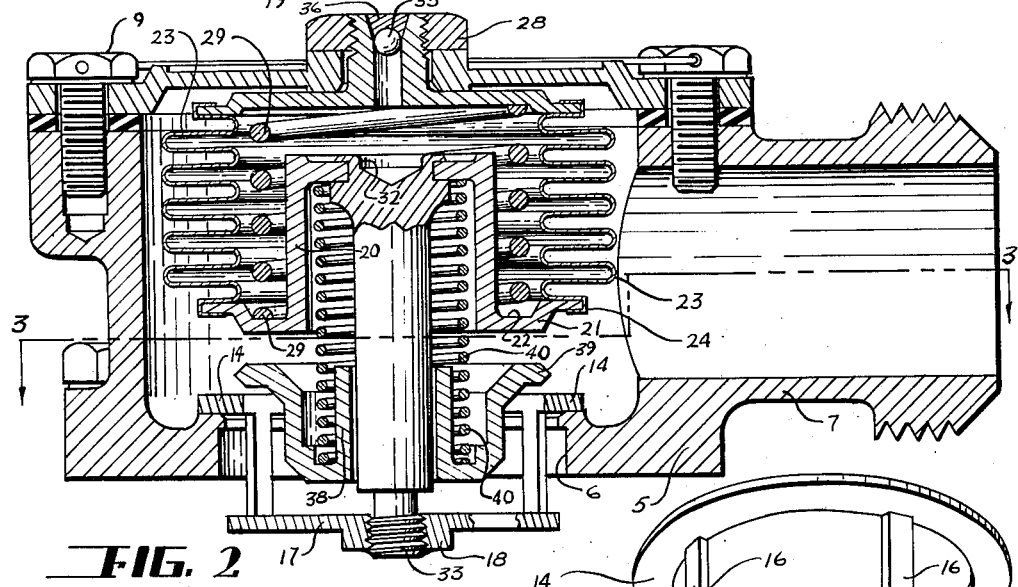
Figures 3, 4:
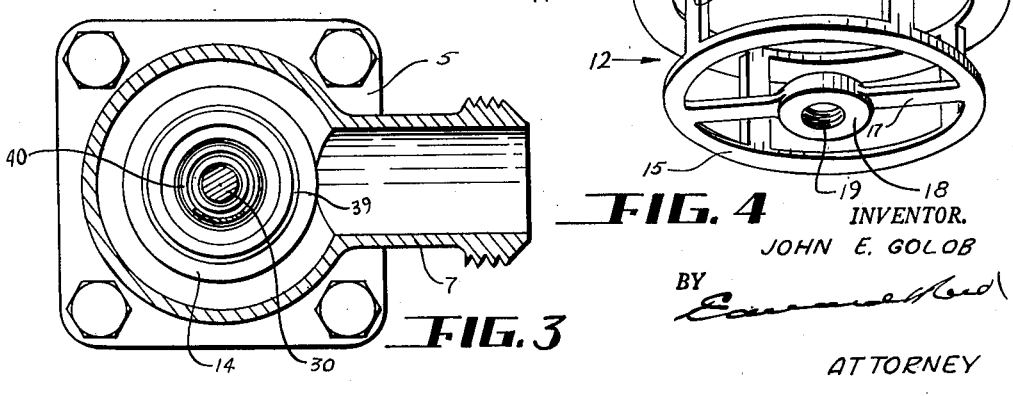

In the accompanying drawings Fig. 1 is a vertical section taken centrally through an apparatus embodying the invention, showing the main valve open; Fig. 2 is a similar section showing the main valve closed and the second valve open; Fig. 3 is a transverse section taken on the line 3—3 of Fig. 2; and Fig. 4 is a perspective view of the main valve member.

As shown in the drawings the apparatus is designed for use on aircraft and comprises a structure adapted to be mounted on, or otherwise connected with, the tank in which the pressure is to be controlled, and having two valve controlled passages through which the interior of the tank may be connected with the atmosphere. The valve for one of these passages is controlled by a device which is responsive to variations in the atmospheric pressure and which operates to maintain that passage open when atmospheric pressure exceeds a predetermined pressure and to close said passage when atmospheric pressure is less than said predetermined pressure. When said valve is in passage closing position the valve for the other passage is normally closed but is yieldable to permit it to be opened by pressure in said tank when that pressure exceeds a predetermined pressure, and thereby vent the tank. Thus when the aircraft is flying at relatively low altitudes the tank will be in open communication with the atmosphere and when flying at relatively high altitudes the tank will be cut off from the atmosphere and pressure will build up therein, but the tank pressure will be prevented from exceeding a predetermined limit. The apparatus as a whole, as well as the various parts thereof, may take various forms without departing from the spirit of the invention.

In the particular construction here shown the supporting structure is in the nature of a casing 5 having in the bottom wall thereof a passage 6 which opens into the interior of the case, which communicates with the atmosphere through an outlet, here shown as a nipple 7 by which the interior of the casing may be connected with a conduit leading to the exterior of the aircraft. The top wall 8 of the casing is removable and is secured to the body of the casing in sealed contact therewith by screws 9. The casing may be mounted on or connected with the tank in any suitable manner, as by securing it to the top wall 10 of the tank, which wall is provided with an opening 11 in line with the opening 6 in the casing.

Mounted in the opening 6 of the casing is a main valve 12 which is of such a character as to provide the passage with two branches or parts through either of which the interior of the tank may be placed in communication with the atmosphere. In the arrangement shown the bottom wall of the casing has on its inner side a valve seat 13 surrounding the opening 6. The valve member 12 comprises an inner annular member 14 and an outer annular member 15. The members 14 and 15 are rigidly connected one with the other in axially spaced relation by rigid spacing members or standards 16. The outer annular member 15 has an outside diameter slightly less than the diameter of the opening 6, so that it may enter that opening. The inner annular member 14 has an outside diameter slightly greater than the diameter of the opening 6 and is connected adjacent its inner edge with the standards 16 so that it projects laterally and overhangs the valve seat 13. Thus one branch of the passage between the tank and the atmosphere extends laterally between the members 14 and 15 and the other branch extends through the member 14. The outer annular member 15 is also provided with a transverse bar 17 having an enlarged intermediate portion 18 provided with a screw threaded opening 19, for a purpose which will hereinafter appear.

Mounted in the casing is an expansible device which is responsive to variations in the atmospheric pressure. In the present construction this device comprises a cylindrical member 20 having at its lower edge a lateral flange 21 which is preferably provided adjacent the cylindrical body with a depression or recess 22. A bellows 23 of a diameter substantially greater than the diameter of the cylindrical body 20 has sealed connection at its lower end with the flange 21, as shown at 24, and has at its upper end sealed connection at 25 with the edge of a circular plate 26 arranged within the upper portion of the casing and rigidly secured to the top wall 8, as by providing the same with a stud 27 which extends through a central opening in the top wall and is secured therein by a nut 28. Arranged within the space between the cylindrical member 20 and the bellows is a spring 29 which is seated in the recess in the flange 21 and is confined between that flange and the fixed plate 26, and which tends to move the cylindrical member toward the bottom wall of the casing. The cylindrical member 20 is rigidly connected with the valve member 12 so that the latter moves with the cylindrical member. In the present instance this connection comprises a post 30 which is rigidly secured to the top wall of the cylindrical member. In the arrangement shown this top wall comprises an annular inwardly extending flange 31 and the upper end of the post has a reduced portion 32 which extends through the opening formed by the flange and is rigidly secured therein, as by swedging or peening the upper end of the reduced portion over the flange. It may be soldered or welded to the flange to tightly seal the connection between the post and the flange. The post has at its lower end a reduced portion 33 which is screw threaded into the opening 19 in the cross bar of the outer member 15 of the valve 12. The spring 29 is of such strength with relation to the bellows that the atmospheric pressure, at relatively low altitudes, will contract the bellows against the action of the spring and will thus support the valve member 12 in its uppermost position, in which the upper part 14 of the valve member is spaced from the valve seat 13 so that the lateral passage through the valve is in open communication with the interior of the casing and with the atmosphere. When atmospheric pressure decreases, at a higher altitude, the spring 29 overcomes the atmospheric pressure and extends the bellows thereby moving the cylindrical member and the valve member 12 downwardly, and when atmospheric pressure has fallen below a predetermined pressure the member 14 of the valve 12 will engage the valve seat 13 and thereby interrupt communication between the tank and the atmosphere through the lateral passage and permit pressure to build up in the tank. The expansible device may be so constructed as to cause the communication between the tank and the atmosphere to be interrupted at any desired altitude, say 18,000 feet. Air or gas within the bellows would adversely affect the operation of the expansible device and this effect would vary with variations in atmospheric temperature. It is therefore preferable to evacuate the bellows and for this purpose the stud 27 by which the top plate 26 of the expansible structure is connected with the top wall 8 of the casing is provided with an opening 34 through which air or gas may be withdrawn from the bellows and the opening then sealed, as by inserting therein a closure 35 and tightly sealing the same by solder or the like, as shown at 36.

To prevent the pressure in the tank from building up to an objectionable extent when the valve 12 is in passage closing position, there is provided a second valve member to close the passage through the inner annular member 14 of the valve 12 when that valve is in passage closing position, and this second valve is yieldably retained in its passage closing position to permit the same to open under excessive tank pressure and thereby relieve that pressure, the valve again closing when the pressure within the tank has been reduced to normal. In the construction shown the inside edge of the annular member 14 of the valve member 12 constitutes a valve seat and the second valve member 37 comprises a portion extending into the valve member 12 and having a hub 38 which is slidably mounted on the post 30. At its upper end the valve member 37 has a laterally extending portion or flange 39 which extends above and is adapted to engage the valve seat on the annular member 14. The flange 39 is yieldably retained in engagement with the valve member 12 by a coiled spring 40 confined between the valve member 37 and the flange 31 of the cylindrical member 20, this spring being of such strength that it will retain the flange 39 of the valve member 37 in passage closing position when the valve member 12 is closed and so long as the pressure in the tank does not exceed a predetermined pressure. In the present instance the valve member 39 is retained normally in engagement with the annular member 14 in all positions of the two valve members but it is only essential that the valve member 37 shall be in passage closing position when the valve member 12 is in passage closing position.

It will be apparent, therefore, that when the aircraft on which the apparatus is mounted is operating at relatively low altitude the pressure of the ambient atmosphere will contract the bellows and retain the cylindrical member 20 in an elevated position, and the main valve 12 being rigidly connected with the cylindrical member of the expansible device that valve will be retained in an elevated position so that the lateral passage between the inner and outer members thereof will be open to the atmosphere and the tank will be vented without restriction. When the altitude increases above the predetermined altitude the decreased atmospheric pressure will permit the bellows to expand and the spring 29 will move the cylindrical member downwardly until the member 14 of the valve 12 contacts the valve seat 13, thereby interrupting communication between the tank and the atmosphere through the lateral passage in valve 12. During this movement of the valve member 12 the second valve member 37 is retained in engagement with the valve member 12, thus maintaining the passage through the inner annular member 14 of the valve member 12 closed. If the tank pressure builds up beyond a predetermined limit the pressure on the valve member 37 will move the same upwardly with relation to the valve member 12 and thus open the by-pass passage through the annular member 14, as shown in Fig. 2. When this passage is opened excess gases and vapors will escape to the atmosphere and the pressure in the tank will be quickly relieved and the valve member 37 will again move to its closed position.

While I have shown and described one embodiment of my invention, I wish it to be understood that I do not desire to be limited to the details thereof as various modifications may occur to a person skilled in the art.

Having now fully described my invention, what I claim as new and desire to secure by Letters Patent is:

1. An apparatus for controlling pressure, comprising a casing having a passage formed therein, an inwardly facing valve seat surrounding said passage adjacent a first end thereof, a valve member supported for axial movement in the first mentioned end portion of said passage, having an axial opening therethrough and having a lateral opening communicating with said axial opening, said valve member also having adjacent the inner end thereof a part to engage said valve seat and a part forming a second valve seat about the inner end of said opening, a post rigidly secured to said valve member, a second valve member slidably mounted on said post and adapted to engage said second valve seat, an expansible device in said casing to actuate said valve members including a movable member secured to said post, a bellows having sealed connection with said movable member and with a fixed part of said casing, a spring confined between said movable member and said fixed part of said casing, and a second spring confined between said movable member and said second valve member to yieldably retain the latter in engagement with said second valve seat when the first mentioned valve member is in passage closing position.

2. An apparatus for controlling pressure, comprising a casing having a passage formed therein, an inwardly facing valve seat surrounding said passage adjacent a first end thereof, a valve member mounted in said passage and comprising inner and outer annular parts rigidly connected one with the other in axially spaced relation and having a lateral opening between said parts, said outer part being of an outside diameter less than the diameter of said passage and said inner part being of an outside diameter greater than the diameter of said passage and having a part to engage said valve seat, a device in said casing including a movable member and means responsive to variations in pressure in one portion of said passage to actuate said movable member, means actuated by said movable member of said device to move said valve member toward and from said seat, said inner annular part of said valve member having a valve seat at the inner edge thereof, a second valve member movable with relation to the first mentioned valve member and to said device, and means for yieldably retaining said second valve member in engagement with the valve seat on said inner part of the first mentioned valve member.

3. In a control valve, a structure having a two part passage, a first valve member to control the flow of gases through one part of said passage, a second valve member having a part to engage said first valve member and close the other part of said passage, a movable device rigidly connected with said first valve member and including a sealed bellows and a spring tending to move said first mentioned valve member to passage closing position as the pressure surrounding said bellows decreases, and a second spring confined between said device and said second valve member to move the latter to passage closing position, said second spring moving said second valve member in the same direction as said first valve member is moved by said first spring.

4. An apparatus for controlling pressure, comprising a casing having a passage formed therein, an inwardly facing valve seat surrounding said passage adjacent a first end of said passage, a valve member supported in said passage for axial movement and having an opening therethrough, said valve member having on one side thereof a part to engage said valve seat and having on the other side thereof a part forming a second valve seat surrounding said opening, a second valve member movable with relation to the first mentioned valve member into and out of engagement with said second valve seat, yieldable means for retaining said second valve member on said second valve seat against normal pressure for permitting the same to be moved to passage opening position by excessive pressure while the first mentioned valve member is in passage closing position, and a device controlled by pressure in said first end of said passage to retain said first mentioned valve member in passage opening position when the pressure in said first end of said passage exceeds predetermined pressure and to move the same to passage closing position when pressure in said first end of said passage is less than said predetermined pressure.

5. A pressure control apparatus, comprising a casing having a passage formed therein, an inwardly facing valve seat surrounding said passage adjacent a first end of said passage, a valve member supported in said passage for axial movement and having an opening therethrough, said valve member having on one side thereof a part to engage said valve seat and having on the other side thereof a part forming a second valve seat surrounding said opening, a second valve member movable with relation to said first mentioned valve member into and out of engagement with said second valve seat, a device movably mounted in said casing and including a cylindrical member having at one end thereof a flange, a spring confined between said flange and a fixed part of said casing, and a bellows surrounding said spring having sealed connection with said flange and with said fixed part of said casing, an elongated part rigidly connecting said cylindrical member with the first mentioned valve member, and a spring supported about said elongated part and confined between said cylindrical member and said second valve member to retain said second valve member on said second valve seat against normal pressure in said first mentioned end of said passage and to permit the same to be moved to passage opening position by excessive pressure while the first mentioned valve member is in passage closing position.

6. An apparatus for controlling pressure, comprising a structure having a two part passage, a first valve member to control the flow of fluid through a first part of said passage, a second valve member to control the flow of fluid through the other part of said passage, an expansible device controlled by pressure in the passage on one side of said valve members to retain said first mentioned valve member in passage opening position when the pressure on said one side exceeds a predetermined pressure and for moving the same to passage closing position when said pressure on said one side is less than said predetermined pressure, and means for yieldably retaining said second valve member in passage closing position when the first mentioned valve member is in passage closing position, said second valve member being movable by excessive pressure on the other side of said valve members to passage opening position while said first mentioned valve member is in passage closing position.

7. An apparatus for controlling pressure, comprising a structure having a two part passage, a first valve member to control the flow of fluid through one part of said passage, a second valve member having a part to engage said first valve member and normally close the other part of said passage and movable with relation to said first valve member by excessive pressure on the one side of said valve members to open the other part of said passage, means to yieldably retain said second valve member in engagement with said first valve member, and means controlled by the pressure on the other side of said valve members to retain said first valve member in passage opening position at a given pressure and to move the same to passage closing position at a different pressure.

8. In a pressure control valve, a valve body having a passage formed therein, valve means for controlling the flow of fluid from a first portion of said passage to a second portion of said passage, said valve means comprising a first valve element, means responsive to pressure changes within said first portion of said passage for opening and closing said first valve element, said first valve element comprising a circular member having a central opening, a second valve member for closing said central opening, yieldable means for retaining said second valve member in closed position against normal pressure in said second portion of said passage, said retaining means being yieldable at a predetermined excessive pressure in said second portion of said passage so as to substantially equalize the pressure within said first and second portions.

9. In a pressure control valve, a valve body having a passage formed therein, valve means for controlling the flow of fluid from a first portion of said passage to a second portion of said passage, said valve means including a sealed bellows responsive to variations in the pressure in said first portion of said passage to control the flow of fluid between said first and second portions of said passage, said valve means including means operable by a predetermined excessive pressure in said second portion of said passage for connecting said first and second portions of said passage.

10. In a fluid flow control valve, a valve body having a passage formed therein, valve means for controlling the flow of fluid between a first portion of said passage and a second portion of said passage, said valve means including first valve means responsive to variations in the pressure in the first portion of said passage to control the flow of fluid between said first and second passage portions, and including second valve means operable by excessive pressure in said second portion of said passage to control the flow of fluid between said first and second passage portions when said first valve means is closed, and means to yieldably retain said second valve means in closed position.

11. In a fluid flow control valve, means forming a valve body having a fluid passage therein, a valve member to control the flow of fluid through one part of said passage, a second valve member to control the flow of fluid through the other part of said passage and movable to a passage opening position by excessive pressure on the outer side of said second valve member, means acting on the inner side of said second valve member to yieldably retain the same normally in passage closing position, and means controlled by pressure on the inner side of said second valve member for retaining said first mentioned valve member in passage opening position at a given pressure and for moving the same to passage closing position at a different pressure while said second valve member is retained in passage closing position.

JOHN E. GOLOB.

References Cited in the file of this patent

UNITED STATES PATENTS

| Number | Name | Date |
| --- | --- | --- |
| 1,694,492 | Tabler | Dec. 11, 1928 |
| 2,345,547 | Roth | Mar. 28, 1944 |
| 2,366,146 | Martin-Hurst | Dec. 26, 1944 |
| 2,393,343 | Schroeder | Jan. 22, 1946 |
| 2,437,187 | Eshbaugh | Mar. 2, 1948 |
| 2,463,487 | Widgery | Mar. 1, 1949 |
| 2,484,846 | Paget | Oct. 18, 1949 |